US011365336B2

(12) United States Patent
Bougher et al.

(10) Patent No.: US 11,365,336 B2
(45) Date of Patent: Jun. 21, 2022

(54) POLYMER-POLYMER FIBER COMPOSITE FOR HIGH THERMAL CONDUCTIVITY

(71) Applicant: Georgia Tech Research Corporation, Atlanta, GA (US)

(72) Inventors: Thomas L. Bougher, Atlanta, GA (US); Matthew K. Smith, Atlanta, GA (US); Baratunde Cola, Atlanta, GA (US); Kyriaki Kalaitzidou, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 222 days.

(21) Appl. No.: 16/664,779

(22) Filed: Oct. 25, 2019

(65) Prior Publication Data

US 2020/0131419 A1    Apr. 30, 2020

Related U.S. Application Data

(60) Provisional application No. 62/751,442, filed on Oct. 26, 2018.

(51) Int. Cl.
| | | |
|---|---|---|
| *C09K 5/14* | (2006.01) | |
| *B33Y 70/00* | (2020.01) | |
| *B29B 15/12* | (2006.01) | |
| *B29C 70/88* | (2006.01) | |
| *B29C 64/118* | (2017.01) | |
| *B33Y 70/10* | (2020.01) | |

(52) U.S. Cl.
CPC ........... *C09K 5/14* (2013.01); *B33Y 70/00* (2014.12); *B29B 15/12* (2013.01); *B29B 15/125* (2013.01); *B29C 64/118* (2017.08); *B29C 70/882* (2013.01); *B29K 2995/0005* (2013.01); *B33Y 70/10* (2020.01)

(58) Field of Classification Search
CPC .......... C09K 5/14; B33Y 70/00; B33Y 70/10; B29B 15/12; B29B 15/125; B29K 2995/0005; B29C 64/118; B29C 70/882
USPC .................................................. 252/78.1, 77
See application file for complete search history.

(56) References Cited

U.S. PATENT DOCUMENTS

| | | | |
|---|---|---|---|
| 5,232,970 | A | 8/1993 | Solc |
| 6,433,037 | B1 | 8/2002 | Guzauskas |
| 8,921,507 | B2 | 12/2014 | Yoshihara |
| 8,957,157 | B2 | 2/2015 | Atarashi |
| 9,434,870 | B2 * | 9/2016 | Raman ............ C08K 3/04 |
| 10,227,490 | B2 * | 3/2019 | Heikkila ............ B29C 64/165 |
| 11,161,984 | B2 * | 11/2021 | Heikkila ............ C08K 7/02 |
| 2012/0153239 | A1 | 6/2012 | Chandrasekhar |
| 2015/0184055 | A1 * | 7/2015 | Raman ............ B29C 48/03 252/75 |
| 2015/0275063 | A1 * | 10/2015 | Raman ............ C08K 3/34 252/75 |
| 2016/0002468 | A1 * | 1/2016 | Heikkila ............ C08K 7/02 428/35.6 |
| 2017/0183475 | A1 * | 6/2017 | Zhang ............ C08K 3/38 |

OTHER PUBLICATIONS

Bolto, Brian, et al. "Crosslinked poly (vinyl alcohol) membranes." Progress in Polymer Science 34.9 (2009): 969-981.
Cogswell, F. N. "An introduction to thermoplastic composite materials." Thermoplastic aromatic polymer composites, 1st ed. Oxford: Butterworth-Heineman Ltd (1992): 1-10.
Cogswell, Frederic Neil. Thermoplastic aromatic polymer composites: a study of the structure, processing and properties of carbon fibre reinforced polyetheretherketone and related materials. Elsevier, 2013. part I & part IV.
De, S. K., and J. R. White, eds. Short fibre-polymer composites. Woodhead Publishing, 1996. pp. 1-53.
Friedrich, K. "Microstructural efficiency and fracture toughness of short fiber/thermoplastic matrix composites" Composites Science and Technology 22.1 (1985): 43-74.
Fu, Yuan-Xiang, et al. "Thermal conductivity enhancement with different fillers for epoxy resin adhesives." Applied thermal engineering 66.1-2 (2014): 493-498.
Gaska, Karolina, et al. "Enhanced thermal conductivity of epoxy-matrix composites with hybrid fillers." Polymers for Advanced Technologies 26.1 (2015): 26-31.
Guo, Fang, et al. "Tribological properties of PBO fabric composites modified by poly (vinyl alcohol)." Journal of Applied Polymer Science 130.2 (2013): 1313-1320.
Hu, Zhen, et al. "Facile preparation of poly (p-phenylene benzobisoxazole)/graphene composite films via one-pot in situ polymerization." Polymer 71 (2015): 8-14.
Murty, V. M., and S. K. De. "Short-fiber-reinforced styrene-butadiene rubber composites" Journal of applied polymer science 29.4 (1984): 1355-1368.

(Continued)

*Primary Examiner* — Douglas J Mc Ginty
(74) *Attorney, Agent, or Firm* — Troutman Pepper Hamilton Sanders LLP; Ryan A. Schneider (57) ABSTRACT

In order to provide a thermally conductive polymer-based resin that may be molded using a range of thermoplastic manufacturing techniques, a composition includes a thermoplastic polymer and/or elastomer, a polymer fiber, a binding agent, and a thermally conductive filler. The composition includes from 40 to 80 volume percentage of a thermoplastic polymer and/or a thermoplastic elastomer, from 5 to 30 volume percentage of a polymer fiber, from 0.1 to 20 volume percentage of a binding agent, and from 10 to 40 volume percentage of a thermally conductive filler. The polymer fibers and thermally conductive fillers are combined to create a hybrid thermally conductive particle for better feeding in standard plastic processing methods. The polymer fiber has an aspect ratio greater than 10. The filler has a thermal conductivity greater than or equal to 10 W/m-K. The composition is characterized by a thermal conductivity of at least 1 W/m-K.

19 Claims, 5 Drawing Sheets

(56) References Cited

OTHER PUBLICATIONS

Philipp, Warren H., and Li-Chen Hsu. Three Methods for In Situ Cross-Linking of Polyvinyl Alcohol Films for Application as Ion-Conducting Membranes in Potassium Hydroxide Electrolyte. National Aeronautics and Space Administration Cleveland OH Lewis Research Cen Ter, 1979. pp. 1-19.

Rahaman, Muhammad Syukri Abdul, Ahmad Fauzi Ismail, and Azeman Mustafa. "A review of heat treatment on polyacrylonitrile fiber." Polymer degradation and Stability 92.8 (2007): 1421-1432.

Sengupta, Rajatendu, et al. "A review on the mechanical and electrical properties of graphite and modified graphite reinforced polymer composites." Progress in polymer science 36.5 (2011): 638-670.

* cited by examiner

POLYMER-POLYMER FIBER COMPOSITE FOR HIGH THERMAL CONDUCTIVITY

PRIORITY

This application claims the benefit of U.S. Provisional Patent Application Ser. No. 62/751,442, filed on Oct. 26, 2018, which is hereby incorporated by reference in its entirety.

BACKGROUND

As electronic devices continue to shrink in size, power density of the electronic devices continues to rise, which makes the removal of heat a growing challenge. In addition, most established consumer electronic industries are very cost competitive due to outsourcing and materials cost minimization efforts. Plastics are cheaper to manufacture than metals because of the ease of processing, but the use of plastics is often limited due to poor thermal conduction, which results in thermal management issues.

Many commercial suppliers make polymer composite materials filled with thermally conductivity particles to create plastic parts that conduct heat and may replace metals. These composites may be processed similarly to traditional plastics (e.g., injection molded, compression molded, extruded, etc.), but such composites often suffer from a degradation of properties such as increased brittleness, increased electrical conductivity, and/or poor surface finish.

One of the problems with filler particles made of metals, ceramics, and even carbon is that a molten polymer matrix often does not wet well to a surface, causing poor filler dispersion, weak adhesion, and voiding at interfaces. In contrast, using polymeric fillers may create better dispersion and stronger adhesion between the polymer fillers and the polymer matrix.

Polymer fibers that have high thermal conductivity in the axial direction may be used as a thermally conductive filler without sacrificing mechanical properties, electrical isolation, and/or surface finish. A range of commercially available microfibers including, for example, microfibers made from polyethylene (PE), poly(p-phenylene benzobisoxazole) (PBO), and poly(p-phenylene benzobisthiazole) (PBT) have thermal conductivity greater than 10 W/m-K. Additionally, polymer nanofibers made from electrospinning may be made at large scale and have high thermal conductivity.

SUMMARY AND DESCRIPTION

The scope of the present invention is defined solely by the appended claims and is not affected to any degree by the statements within this summary.

In order to provide a thermally conductive polymer resin that may be molded through standard techniques (e.g., injection molding, compression molding) as well as additive manufacturing (e.g. FDM and selective laser sintering), a composition includes a thermoplastic polymer and/or elastomer, polymer fibers, a binding agent, and a thermally conductive filler.

In one example, a thermally conductive composition includes from 40 to 80 volume percentage of a thermoplastic polymer, a thermoplastic elastomer, or a combination thereof, and from 5 to 30 volume percentage of a polymer fiber with an aspect ratio greater than 10, and a thermal conductivity in the axial direction greater than or equal to 1 W/m-K. The composition also includes from 10 to 40 volume percentage of a thermally conductive filler with a thermal conductivity greater than or equal to 10 W/m-K in at least one direction, and from 0.1 to 20 volume percentage of a binding agent. The composition is characterized by a thermal conductivity of at least 1 W/m-K.

In one example, a combination of the polymer fibers, the thermally conductive filler, and the binding agent form a hybrid thermally conductive material characterized by a thermal conductivity of at least 3 W/m-K.

In one example, the composition includes the thermoplastic polymer, the thermoplastic polymer including polyamide, polystyrene, polyester, acrylonitrile butadiene styrene, polyphenylene sulfide, polyphenylsulfone, polycarbonate, polyolefin, thermoplastic polyurethane, polyetherimide, liquid crystal polymer, poly(methyl methacrylate), polyaryletherketone, ethylene-vinyl acetate, acrylic styrene acrylonitrile or any combination thereof.

In one example, the polymer fiber includes polyethylene terephthalate, polybutylene terephthalate, poly(p-phenylene-2,6-benzobisoxazole), polyester, polyamide, polythiophene, poly(vinyl alcohol), polyaniline, polyacrylonitrile, aramid, natural, cellulose, or any combination thereof.

In one example, the binding agent includes aniline, polyaniline, poly(vinyl alcohol), thermoplastic polyurethane, epoxy, ethylene-vinyl acetate, polyethylene oxide, maelic anhydride grafted olefins, or any combination thereof.

In one example, the binding agent includes a block or graft copolymer containing monomers from the thermoplastic matrix and polymer fibers.

In one example, the thermally conductive filler has a maximum dimension less than or equal to 0.5 mm.

In one example, the polymer fiber has a diameter less than 0.1 mm.

In one example, the polymer fiber has a melting temperature greater than or equal to 20° C. above a melt processing temperature of the thermoplastic polymer, the thermoplastic elastomer, or the combination thereof.

In one example, the thermally conductive filler includes aluminum nitride, aluminum oxide, boron nitride, silicon carbide, graphite, graphene, graphite oxide, expanded graphite, carbon fibers, carbon nanotubes, metal wires, diamond particles, zinc oxide, magnesium hydroxide, silicon nitride, or any combination thereof.

In one example, a method for manufacturing a thermally conductive resin includes forming thermally conductive polymer-based pellets. The forming includes mixing a hybrid thermally conductive filler and a thermoplastic matrix. The hybrid thermally conductive filler includes thermally conductive fillers and polymer fibers.

In one example, forming the thermally conductive polymer-based pellets further includes melting the thermoplastic matrix and forming a solid piece of composite material. Forming the solid piece of composite material includes mixing the melted thermoplastic matrix and the hybrid thermally conductive filler, and cooling the mixed melted thermoplastic matrix and hybrid thermally conductive filler. Forming the thermally conductive polymer-based pellets further includes pelletizing the solid piece of composite material.

In one example, the method further includes forming the hybrid thermally conductive filler. Forming the hybrid thermally conductive filler includes combining the polymer fibers, the thermally conductive fillers, and a binding agent. Forming the hybrid thermally conductive filler also includes solidifying the combined polymer fibers, thermally conductive fillers, and binding agent, and chopping the solidified combination, such that chopped hybrid thermally conductive filler particles are formed.

In one example, the chopped hybrid thermally conductive filler particles have a bulk density greater than 0.7 g cm$^{-3}$.

In one example, the chopped hybrid thermally conductive filler particles have a largest dimension between 0.3 and 3 mm.

In one example, combining the polymer fibers, the thermally conductive fillers, and the binding agent includes passing the polymer fibers through a solution bath of the binding agent and the thermally conductive fillers, such that the thermally conductive fillers are attached to the continuous polymer fibers via the binding agent. The thermally conductive fillers are solid. Combining the polymer fibers, the thermally conductive fillers, and the binding agent also includes drying the attached thermally conductive fillers and continuous polymer fibers.

In one example, passing the polymer fibers through the solution bath of the binding agent and the thermally conductive fillers includes passing the continuous polymer fibers through a mixture of molten binding agent and the solid thermally conductive fillers.

In one example, combining the polymer fibers, the thermally conductive fillers, and the binding agent includes combining the polymer fibers, the thermally conductive fillers, and the binding agent in a batch process using an intensive mixer or a Henschel mixer.

In one example, the thermally conductive fillers include aluminum nitride, aluminum oxide, boron nitride, silicon carbide, graphite, graphene, graphite oxide, expanded graphite, carbon fibers, carbon nanotubes, metal wires, diamond particles, zinc oxide, magnesium hydroxide, silicon nitride, or any combination thereof.

In one example, the polymer fibers include polyethylene terephthalate, polybutylene terephthalate, poly(p-phenylene-2,6-benzobisoxazole), polyester, polyamide, polythiophene, poly(vinyl alcohol), polyaniline, polyacrylonitrile, aramid, natural, cellulose, or any combination thereof.

In one example, the method further includes forming a thermally conductive fused deposition modeling (FDM) filament. The forming of the thermally conductive FDM filament includes extruding the thermally conductive polymer-based pellets.

In connection with any one of the aforementioned examples, the composition, the method for manufacturing a thermally conductive filament, the method for manufacturing a thermally conductive component, or the thermally conductive additive manufacturing filament may alternatively or additionally include any combination of one or more of the previous examples.

BRIEF DESCRIPTION OF THE DRAWINGS

For a more complete understanding of the disclosure, reference is made to the following detailed description and accompanying drawing figures, in which like reference numerals may be used to identify like elements in the figures.

DETAILED DESCRIPTION

Thermoplastic composites for use in three-dimensional (3D) printing via fused deposition modeling (FDM) typically include carbon fiber, glass, or metal fillers. These types of fillers are abrasive and will wear down the extruder nozzle during printing. Polymer fibers may be combined with other fillers such as boron nitride flakes or graphite flakes to create a high thermal conductivity 3D printing filament that is non-abrasive.

Thermally conductive polymers (TCPs) have emerged as a new class of materials that may be used for thermal management and heat dissipation challenges. Thermally conductive plastics may be lightweight and low-cost in comparisons to metals. High volume contents of filler are provided to achieve thermal conductivities suitable for efficient heat transport through a polymer composite, and composites with high filler content often make poor injection molded parts because of reduced mechanical strength, increased brittleness, increase in electrical conductivity, and decrease in surface smoothness. Additionally, the process of mixing very large percentages of small, lightweight filler particles into a thermoplastic matrix may present problems both with the feed rate and the dispersion in the melt mix.

One or more of the present embodiments provide a resin composition that may achieve high thermal conductivity when formed using traditional injection molding techniques, is not brittle, does not have a surface that leaves marks, and is easy to combine into a well-mixed thermally conductive resin. In one or more of the present embodiments, electrically conducting and electrically insulating resins with thermal conductivities up to 30 W/m-K and 15 W/m-K, respectively, may be produced. The electrical properties are dictated by the filler type and volume percentage loading, where, for example, oxide, nitride, and polymer based fillers are electrically insulating and result in insulating composites, and metal, carbide, carbon fiber, graphene, graphite, and carbon nanotube based fillers are electrically conducting and result in electrically conducting composites.

Figure 1:
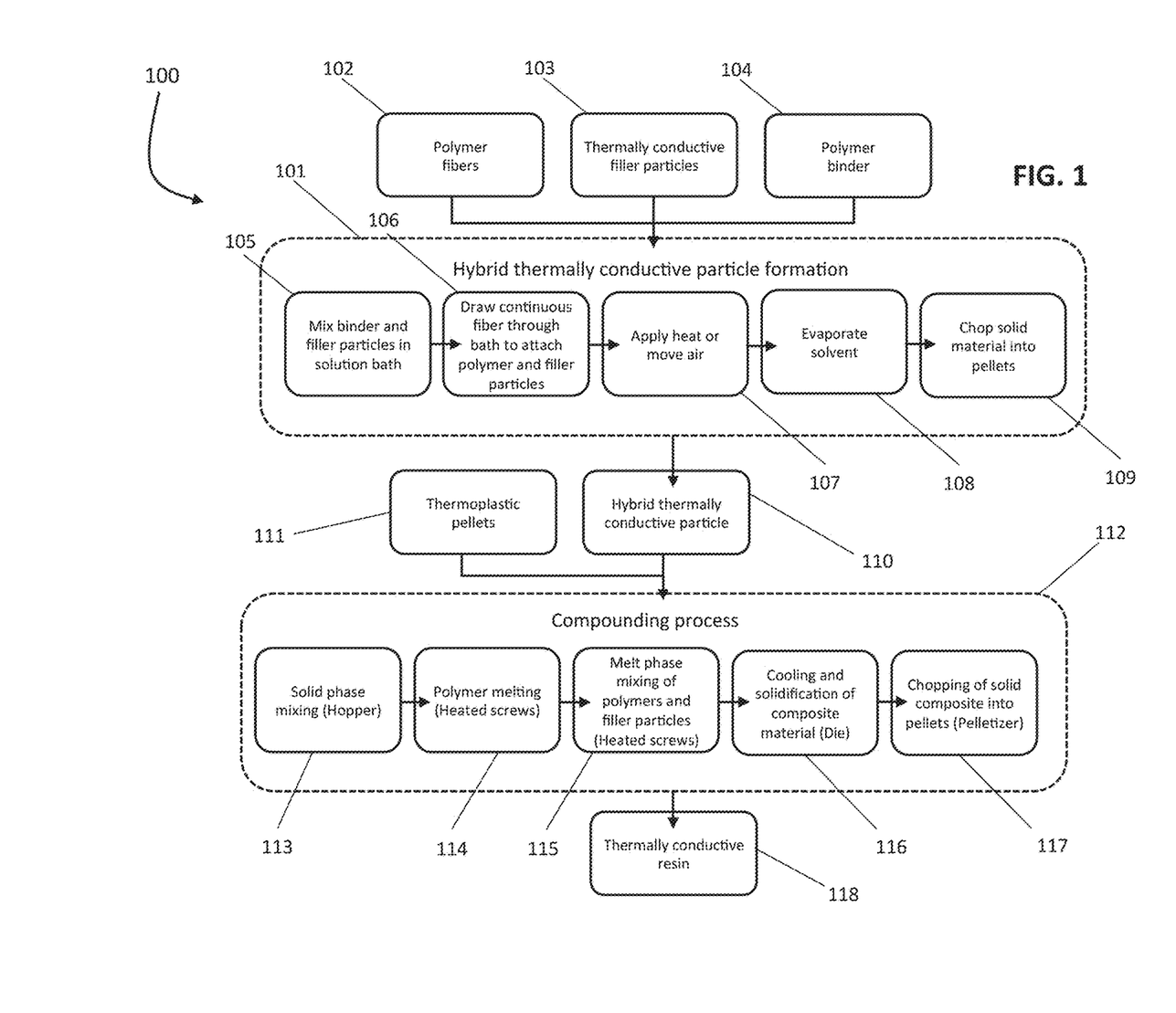
FIG. 1 is a flow diagram of one embodiment of a method for manufacturing a thermally conductive resin.

FIG. 1 shows a flowchart of one example of a method 100 for manufacturing a thermally conductive polymer-based resin. The method 100 is implemented in the order shown, but other orders may be used. Additional, different, or fewer acts may be provided. Similar methods may be used for manufacturing a thermally conductive polymer-based resin.

In act 101, hybrid thermally conductive particles are formed. As shown in the embodiment of FIG. 1, the hybrid conductive particles are formed from a composite material including polymer fibers 102 (e.g., thermoplastic matrix), thermally conductive filler particles 103, and a binding agent 104 (e.g., a polymer binder). One or more types of thermally conductive filler particles 103, one or more types of thermoplastic matrix 102, and/or one or more types of binding agents 104 may be included in the hybrid conductive particle. For example, the polymer fibers 102 may be Poly(p-phenylene benzobisoxazole) fibers, the thermally conductive filler particles 103 may be expanded flake graphite, and the binding agent 104 may be thermoplastic polyurethane. Other combinations may be provided.

The forming 101 of the hybrid thermally conductive particles includes a number of acts. For example, as shown in the embodiment of FIG. 1, the forming 101 includes, in act 105, mixing the polymer binder 104 and the thermally conductive filler particles 103. The polymer binder 104 and the thermally conductive filler particles 103 may be mixed in, for example, a solution bath. Any number of solution baths may be provided. For example, a solution bath of 10% high density polyethylene mixed in xylene may be provided. In act 106, the forming 101 includes drawing a continuous polymer fiber (e.g., the polymer fibers 102) through the solution bath, such that the thermally conductive filler particles 103 become attached to the continuous polymer fiber. The polymer fiber is continuous in that the polymer fibers are not chopped. In other words, a spool of polymer fiber may be unwound and drawn through the solution bath, such that the polymer fiber is pulled through the thermally conductive filler particles 103. In one embodiment, the resultant polymer fiber (e.g., including the attached thermally conductive filler particles 103) is positioned within a mold. In act 107, heat or flowing air is applied to the polymer fibers, binder, and thermally conductive filers. In act 108, the forming 101 includes evaporating a solvent included in the formed part. The solvent evaporates, leaving the polymer binder 104 holding the thermally conductive filler particles 103 to the polymer fibers 102. Any number of solvents including, for example, xylene may be used. In one embodiment, evaporating the solvent includes applying heat to the formed part, such that the solvent evaporates but the formed part does not melt. In other words, heat is applied to the formed part such that a temperature of the formed part is above an evaporation temperature of the solvent but below a melting temperature of the formed part. In act 109, the formed part is chopped into pellets. In one embodiment, the formed part is chopped into pellets (e.g., hybrid thermally conductive pellets) using a pelletizer. The formed part may be chopped into any number of sizes including, for example, lengths between 0.25 and 5 mm. The forming of the hybrid thermally conductive particles in act 101 may include more, fewer, and/or different acts.

In act 120, thermally conductive polymer-based pellets are formed. As shown in the embodiment of FIG. 1, the thermally conductive polymer-based pellets are formed from a composite material including hybrid thermally conductive particles 110 (e.g., formed in act 109), and a thermoplastic matrix 111 (e.g., a thermoplastic, thermoplastic pellets). One or more types of hybrid thermally conductive filler particles (e.g., based on the polymer fibers 102, the thermally conductive filler particles 103, and the polymer binder 104 used in act 101), and/or one or more types of thermoplastic pellets may be included in the composite material.

The thermoplastic matrix 111 includes thermoplastic polymers that are used in injection molding processes such as polyamide, polystyrene, polyester, acrylonitrile butadiene styrene, polyphenylene sulfide, polyphenylsulfone, polycarbonate, polyolefin, thermoplastic polyurethane, polyetherimide, liquid crystal polymer, poly(methyl methacrylate), polyaryletherketone, ethylene-vinyl acetate, acrylic styrene acrylonitrile, or any combination thereof.

The thermoplastic 111 is polar in that a covalent bond between two atoms is provided and the electrons form a dipole moment; this dipole moment is repeated along a chain backbone of the thermoplastic 111. The polar thermoplastic 111 may be a polymeric thermoplastic such as acrylonitrile butadiene styrene (ABS), polycarbonate (PC), polyamide (PA), or poly(methyl methacrylate) (PMMA). The polar thermoplastic 111 may be included in the composite material to improve adhesion and dispersion with the hybrid thermally conductive particle 110, which may have a dipole moment imparted through the polymer fibers 102, the thermally conductive filler particles 103, and/or the binding agent 104.

The binding agent 104 may be a thermoplastic polymer that melts during mixing with the thermoplastic matrix 111, or the binding agent may be a thermoset that continues to hold together the thermally conductive filler particles 103 and the polymer fibers 102 during melt mixing. For example, the binding agent 104 may be a thermoplastic polyurethane, with a hardness of 70 A, that is combined with expanded graphite flakes and PBO fibers to form a thermally conductive particle. This mixture may then be compounded with thermoplastic polyurethane with a hardness of 95 A to create pellets of thermally conductive plastic. Other material combinations may be provided.

In another example the binding agent 104 may be an epoxy that cures in place on the hybrid thermally conductive particles 110. In a case where the binding agent 104 may not melt during compounding with the thermoplastic matrix 111, a particle size of the hybrid thermally conductive particles 110 is important. In this case, using thermally conductive filler particles 103 with a mean particle size of 50 microns and polymer fibers 102 with a diameter of 20 microns, for example, may be combined such that a particle size of the resulting hybrid thermally conductive particles is still below 300 microns.

Components of the hybrid thermally conductive particle 110 (e.g., hybrid thermally conductive filler particle) may be chosen to increase adhesion with the hybrid thermally conductive particle. For example, if polyvinyl alcohol (PVA) is used as the binding agent 104 and graphite oxide is used as the thermally conductive filler particle 103, the hydroxyl side chain of the polymer will strongly interact with the hydroxyl moieties on the surface of the oxidized graphite, creating good wetting and strong adhesion between the binding agent 104 and the thermally conductive filler particle 103. Additionally, if an oxidized polyacrylonitrile (PAN) fiber is used, a surface of the oxidized fiber will create strong adhesion with oxidized graphite and PVA. This composition is well-suited for high-volume production since PVA may be processed using water as the solvent, preventing the need for expensive solvent recovery and disposal processes.

An example of one composition is 25 volume percentage graphite flakes, 12 volume percentage Polyparaphenylene terephthalamide fibers, and 63 volume percentage PC/ABS. This composition is characterized by having a thermal conductivity of 6 W/m-K and an Izod notched impact strength of 200 J/m. Other compositions may be provided. Another example of the composition of the hybrid thermally conductive particle 110 is 40 volume percentage of graphite flakes (e.g., mean particle diameter of 50 microns) as the thermally conductive filler particles 103, 40 volume percentage thermoplastic polyurethane (e.g., hardness 70 A) as the binding agent 104, and 20 volume percentage poly (phenylene benzobisthiazole) (PBT) fibers (e.g., fiber diameter 25 microns, length 500 microns) as the polymer fibers 102. This composite is characterized by a thermal conductivity of 40 W/m-K and a bulk density of 0.8 g/cm$^3$.

The components of the hybrid thermally conductive filler particle 110 may be chosen to create an electrically insulating particle that may be mixed with a common thermoplastic to produce an electrically insulating thermally conducting plastic. For example, if the polymer fiber 102 is made of poly(p-phenylene-2,6-benzobisoxazole) (PBO), the thermally conductive filler particles 103 are made of boron nitride, and the polymer binder 104 is maleic anhydride grafted polypropylene, then the hybrid thermally conductive filler particle 110 will be electrically insulating and may be combined with polypropylene (e.g., as the thermoplastic matrix 111) to create an electrically insulating thermally conductive plastic.

Another example of a composition is 15 volume percentage of boron nitride flakes, 7 volume percentage thermoplastic polyurethane, 12 volume percentage PBO fibers, and 66 volume percentage polycarbonate. This composite is characterized by a thermal conductivity of 5 W/m-K and an electrical resistivity greater than $10^{12}$ Ω-cm.

The components of the hybrid thermally conductive filler particle 110 may be chosen to create an electrically conducting particle that may provide shielding from electromagnetic interference (EMI) and radio frequency interference (RFI). For example, if the polymer fiber 102 is made of PAN, the thermally conductive filler particles 103 are made of graphite, and the polymer binder 104 is polyaniline (PANi), then the hybrid conductive filler particle 110 will be electrically conducting and may be combined with nylon 6 to create an electrically conducting thermally conducting plastic capable of reducing EMI/RFI effects.

Figure 2:
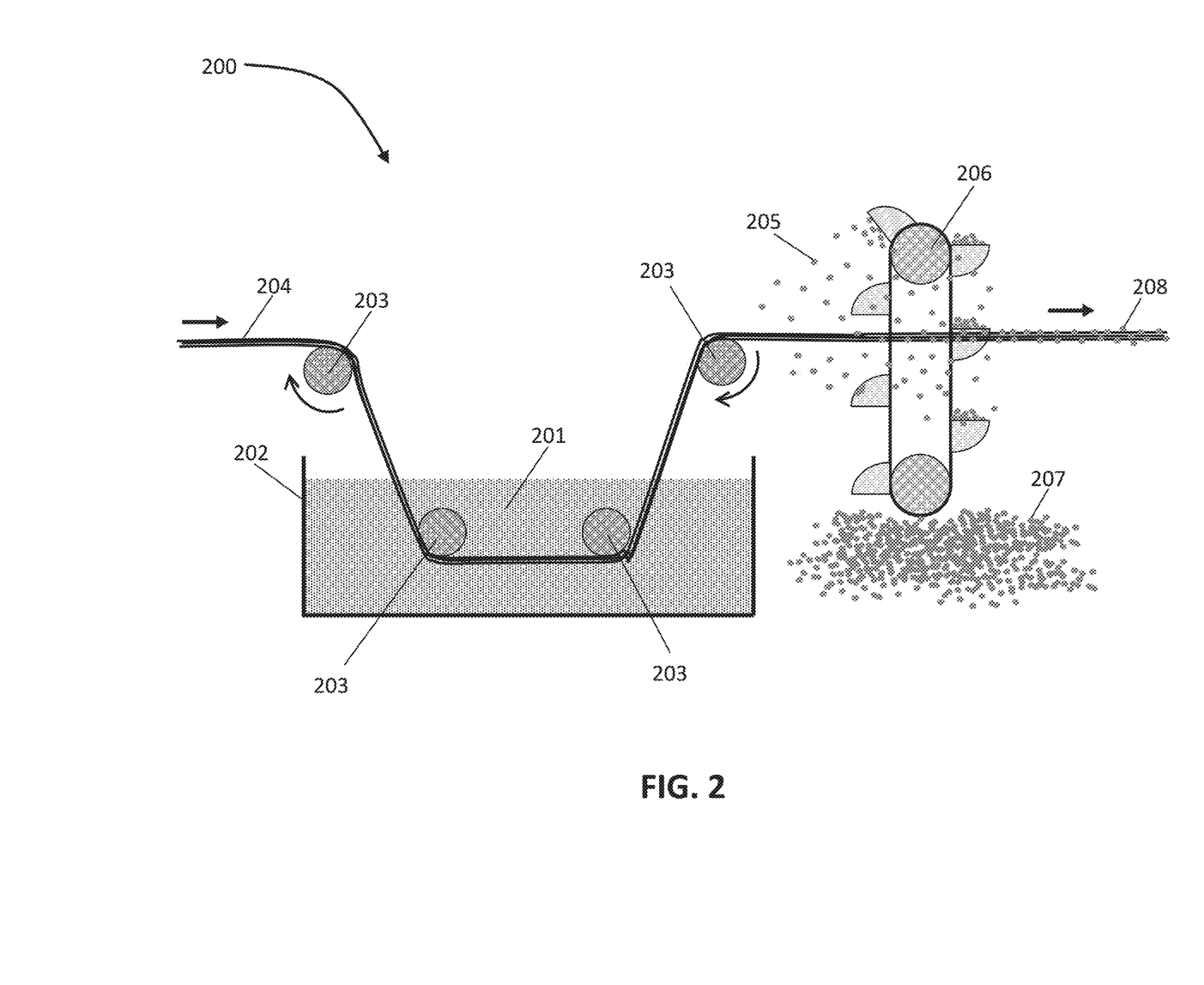
FIG. 2 shows an example of creating a hybrid conductive particle using a molten thermoplastic binding agent.

FIG. 2 illustrates another example of a method 200 to create a hybrid thermally conductive filler particle (e.g., the hybrid thermally conductive particle 111). In one embodiment, the method 200 replaces acts 105-109 of FIG. 1. The binding agent (e.g., the binding agent 104) is a thermoplastic 201. The thermoplastic 201 is melted in a container 202 to produce, for example, molten thermoplastic 201. One or more pulleys 203 (e.g., a series of pulleys) draw a tow of polymer fibers 204 (e.g., the polymer fibers 102) through the molten thermoplastic 201 to create a sticky surface on the polymer fibers 204 (e.g., molten polymer coated tow of fibers 208). Thermally conductive particles 205 (e.g., the thermally conductive filler particles 103) are then dropped onto the tow of polymer fibers 204 coated with molten thermoplastic 201 using a recirculating system 206. The thermally conductive particles 205 that come in contact with the molten polymer coated tow of fibers 208 will stick to the sticky surface and create a coating, which forms a resultant tow. The resultant tow is then cooled to allow the thermoplastic to solidify, creating a solid composite of polymer fibers 204, thermoplastic binding agent 201, and thermally conductive particles 205. The solidified composite is chopped to create hybrid conductive particles for melt compounding.

Figure 3:
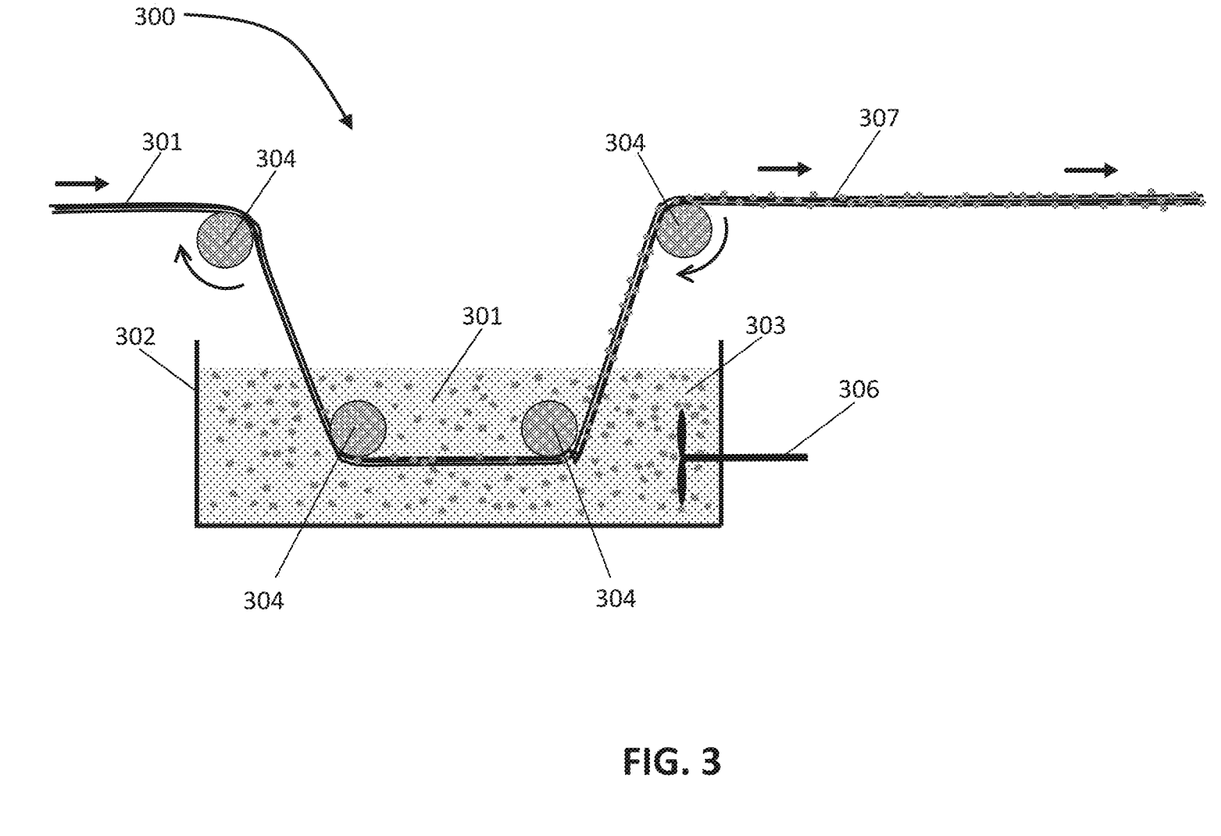
FIG. 3 shows an example of creating a hybrid conductive particle using a solvent bath.

FIG. 3 illustrates an example of a method 300 to create a hybrid thermally conductive particle (e.g., the hybrid thermally conductive particle 111). The method 300 may correspond to acts 105-109 of FIG. 1. A binding agent 301 (e.g., the binding agent 104) is, for example, a polymer dissolved in a solvent that is contained in a vessel 302. The binding agent 301 is mixed with thermally conductive filler particles 303 (e.g., the thermally conductive filler particles 103). The binding agent mixed with the thermally conductive filler particles 303 form a bath. One or more pulleys 304 (e.g., a series of pulleys) draw a tow of fibers 305 (e.g., the polymer fibers 102) through the bath of the binding agent 301 and the thermally conductive filler particles 303. The bath has a high enough viscosity such that a portion of the binding agent 301 and the thermally conductive filler particles 303 will become entrained in the tow of fibers 305 as the tow of fibers 305 are drawn out of the bath. The bath may include an active mixing element 306 to keep the thermally conductive filler particles 303 well dispersed within the solution. Any number of active mixing elements 306 including, for example, a propeller may be used. The solvent is allowed to evaporate, leaving a solid composite of the tow of fibers 305, the polymer binding agent 301, and the thermally conductive filler particles 303. A solidified composite 307 is chopped to create hybrid thermally conductive filler particles for melt compounding.

The formation of the hybrid thermally conductive filler particle allows for more efficient melt compounding of a thermally conductive resin. Many industrial plastic compounding machines use gravity feed systems to dry mix each of the components of a composite material in a barrel. Many thermally conductive filler particle powders and chopped polymer fibers are extremely light and fluffy, which makes it difficult to feed the materials into a hopper at high mass rates necessary for high volume industrial compounding. Although some compounding systems may use side feeders to introduce the filler particles directly into the melted thermoplastic, it is still difficult to do this at extremely high filler concentrations while maintaining good dispersion of the fillers within the thermoplastic matrix. Creating a hybrid thermally conductive particle prior to compounding helps disperse the polymer fibers and thermally conductive fillers and also make the filler particles much larger and heavier. This improves the ability to feed the constituents into the compounder at high mass rates.

The addition of polymer fibers to the thermally conductive polymer resin will create a composite material that in many embodiments has higher thermal conductivity, higher tensile strength, and higher impact toughness compared to a material using the same thermoplastic matrix and thermally conductive filler particles.

Referring to FIG. 1, a compounding process 112 of the method 100 includes acts 113-118. In act 113, solid forms of the hybrid thermally conductive particles 110 and the thermoplastic pellets 111 are mixed. For example, solid forms of the hybrid thermally conductive particles 110 and the thermoplastic matrix 111 are mixed in a hopper or another device for mixing. This produces a solid mixture.

In act 114 of the compounding process 112, heat is applied to the solid mixture. Heat is applied to the solid mixture to raise the solid mixture to a temperature at or above a highest melting temperature of one or more types of thermoplastic of thermoplastic matrix. If the thermoplastic is completely amorphous, then the temperature is raised high enough to achieve adequate melt flow. The heat applied in act 114 melts the thermoplastic matrix 111, while the polymer fibers 102 and the thermally conductive filler particles 103 remain solid. The binding agent 104 may melt or remain solid. In one embodiment, the heat is applied to the solid mixture using heated screws. Other devices for heat application to melt the solid mixture may be used.

In act 115, the melted mixture resulting from act 114 is mixed with the thermally conductive filler particles 103. The melted mixture may be mixed with the thermally conductive filler particles 103 in any number of ways including, for example, with the heated screws used in act 112, other heated screws, and/or another device.

In act 116, a solid piece of the composite material is formed. The forming of the solid piece of the composite material includes cooling and solidifying the mixture of act 115, including the melted mixture resulting from act 114 and the solid thermally conductive filler particles 103. The mixture of act 115 may be cooled and solidified in any number of ways including, for example, through conduction, convection, and radiation away from the mixture, positioned within a die. In other embodiments, active cooling may be used to cool and solidify the mixture of act 115. In one embodiment, a flow of water is used to cool and solidify the mixture of act 115.

In act 117, the cooled and solidified mixture of act 116 is pelletized using, for example, a pelletizer. The pelletizer, for example, cuts the solid piece of the composite material formed in act 116 into the pellets.

In one example, the thermally conductive resin may include a blend of two thermoplastics (e.g., PC and ABS). The polymer fiber 102 may, for example, be PBO, and the thermally conductive filler may be graphite powder. An injection molded part using such a resin 118 may exhibit thermal conductivity up to, for example, 25 W/m-K for the in-plane direction of the part. For example, a possible composite material includes a material composition of 35 volume percentage high purity graphite powder, 15 volume percentage PBO fibers, and 60 volume percentage PC/ABS to achieve greater than 10 W/m-K in a molded part, with an impact toughness of greater than 250 J/m. Other combinations may be provided.

Figure 4:
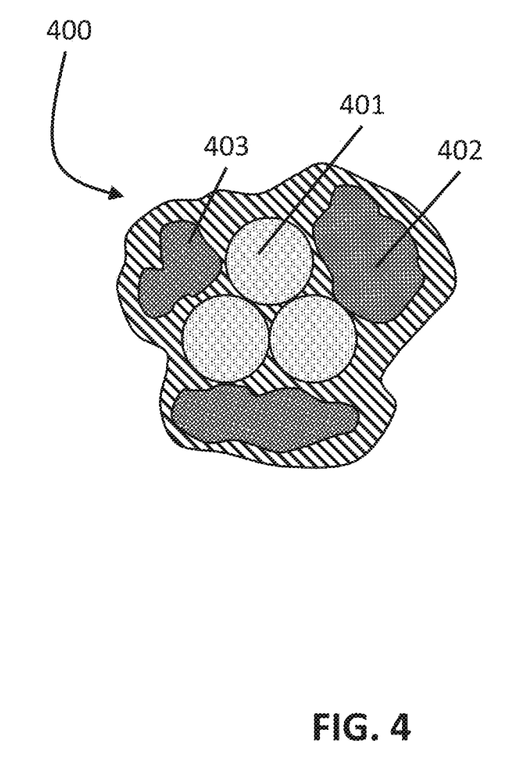
FIG. 4 is diagram of an example of a hybrid conductive particle.

FIG. 4 shows a diagram of an example of a hybrid conductive particle 400. In the center of the particle are polymer fibers 401 that are surrounded by thermally conductive filler particles 402. The polymer fibers 401 and the thermally conductive filler particles 402 are held together by a binding polymer 403. Other configurations may be provided.

Figure 5:
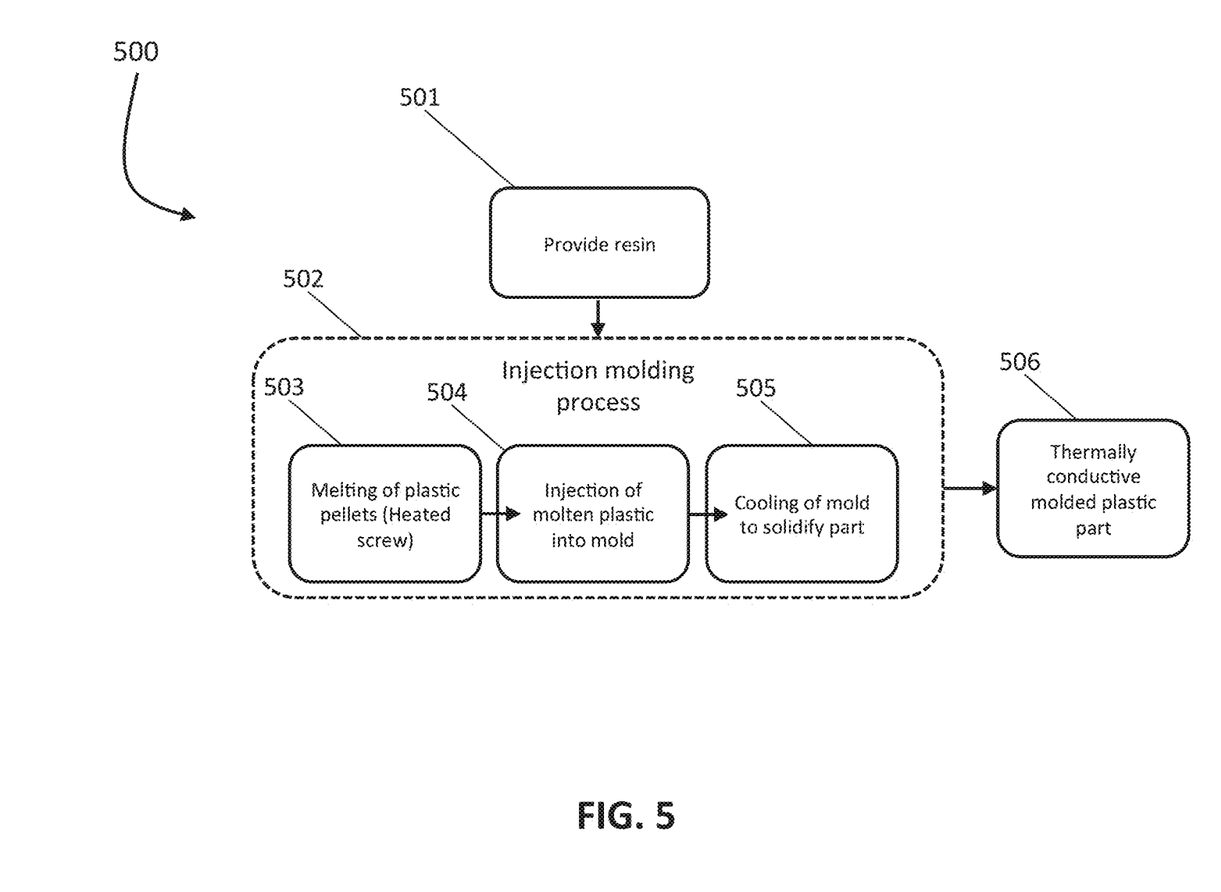
FIG. 5 is a flow diagram of one embodiment of a method for manufacturing a thermally conductive component via injection molding; and While the disclosed devices, systems, and methods are representative of embodiments in various forms, specific embodiments are illustrated in the drawings (and are hereafter described), with the understanding that the disclosure is intended to be illustrative, and is not intended to limit the claim scope to the specific embodiments described and illustrated herein.

FIG. 5 shows a flowchart of one example of a method 500 for manufacturing a thermally conductive component. The method 500 is implemented in the order shown, but other orders may be used. Additional, different, or fewer acts may be provided. Similar methods may be used for manufacturing a thermally conductive component.

In act 501, a thermally conductive resin is provided. The thermally conductive resin may be a filament manufactured using the method 100 or another method. The thermally conductive resin may be made of any number compositions. For example, the thermally conductive resin may be made of a composition including from 40 to 80 volume percentage of a thermoplastic polymer, a thermoplastic elastomer, or a combination thereof. The composition also includes from 5 to 30 volume percentage of a polymer fiber with an aspect ratio greater than 10, and a thermal conductivity in the axial direction greater than or equal to 1 W/m-K. The composition also includes from 1 to 20 volume percentage of a binding agent. The composition also includes from 10 to 40 volume percentage of a thermally conductive filler with an intrinsic thermal conductivity greater than or equal to 10 W/m-K.

In another example, the thermally conductive resin is made of a composition including 50 to 70 volume percentage of a thermoplastic polymer, a thermoplastic elastomer, or a combination thereof. The combination also includes 10 to 25 volume percentage of a polymer fiber with an aspect ratio greater than 10 and a thermal conductivity in the axial direction greater than or equal to 1 W/m-K, and 5-15 volume percentage of a binding agent. The composition also includes 15 to 35 volume percentage of a thermally conductive filler with an intrinsic thermal conductivity greater than or equal to 10 W/m-K.

As an example, the composition is 20 volume percentage of graphite flakes as the thermally conductive filler, 12 volume percentage thermoplastic polyurethane (hardness 70 A) as the binding agent, and 10 volume percentage poly (phenylene benzobisthiazole) (PBT) fibers as the polymer fiber. The thermal conductivity of the graphite flakes is, for example, approximately 200 W/m-K, and the aspect ratio of the polymer fiber is, for example, 40. The thermoplastic matrix includes 10 volume percentage of a thermoplastic elastomer (thermoplastic polyurethane, hardness 95 A) and 48 volume percentage of a thermoplastic polymer, polycarbonate. This composite is characterized by a thermal conductivity of 11 W/m-K.

The thermally conductive filler includes aluminum nitride, aluminum oxide, boron nitride, silicon carbide, graphite, graphene, graphite oxide, expanded graphite, carbon fibers, carbon nanotubes, metal wires, diamond particles, zinc oxide, magnesium hydroxide, silicon nitride, or any combination thereof. The binding agent may increase an adhesion between the polymer fibers and the thermally conductive fillers and/or may improve a wettability of the polymer fibers and/or the thermally conductive fillers to a polymer matrix. The composition is, for example, characterized by a thermal conductivity of at least 1 W/m-K. Other compositions may be used.

In act 502, the thermally conductive component is molded using the thermally conductive resin provided in act 501. The thermally conductive component may be formed in any number of ways including, for example, by injection molding, compression molding, using the thermally conductive filament provided in act 702. For example, the molding 502 may include melting the thermally conductive resin provided in act 501 (see act 503) to produce molten plastic, injecting the molten plastic into a mold (see act 504), and cooling the mold (see act 505) to solidify the thermally conductive component. In act 506, the thermally conductive component is removed from the mold and provided.

Other types of manufacturing may be used to produce the thermally conductive component. For example, the thermally conductive component may be additive manufactured. In one embodiment, the thermally conductive component may be additive manufactured by, for example, 3D printing the thermally conductive component directly onto a thermally conductive substrate. For example, the thermally conductive component may be additive manufactured directly onto a metal substrate. In other embodiments, the thermally conductive component is additive manufactured directly onto substrates of other materials.

In one embodiment, the thermally conductive component is a component for a computing device. For example, the thermally conductive component is at least a part of a thermal management device for the computing device. The thermally conductive component may be any number of different types of components including, for example, a heat sink, a heat pipe, a vapor chamber, a heat spreader, or another type of component.

In a first aspect, a composition includes from 40 to 80 volume percentage of a thermoplastic polymer, a thermoplastic elastomer, or a combination thereof, from 5 to 30 volume percentage of a polymer fiber with an aspect ratio greater than 10, and a thermal conductivity in the axial direction greater than or equal to 1 W/m-K; from 1 to 20 volume percentage of a binding agent which holds together the thermally conductive hybrid particle during processing thus creating a high density powder for compounding with a thermoplastic matrix. The binding agent may also increase the adhesion between the polymer fibers and conductive fillers or improves the wettability to the polymer matrix; and from 10 to 40 volume percentage of a thermally conductive filler with an intrinsic thermal conductivity greater than or equal to 10 W/m-K. The thermally conductive filler includes aluminum nitride, aluminum oxide, boron nitride, silicon carbide, graphite, graphene, graphite oxide, expanded graphite, carbon fibers, carbon nanotubes, metal wires, diamond particles, zinc oxide, magnesium hydroxide, silicon nitride, or any combination thereof. The composition is characterized by a thermal conductivity of at least 1 W/m-K. The thermal conductivity of the plastics can be measured using the laser flash method (ASTM E1461). The laser flash method directly measures thermal diffusivity, where the thermal conductivity can be calculated through a calibrated laser flash sample or through independent measurement of the density and specific heat of the sample. The thermal conductivity values referred to herein are the maximum thermal conductivity values achieved by the material, which can often have different values in different orientations.

In a second aspect, a method for manufacturing a thermally conductive resin includes forming a hybrid conductive particle with the polymer fibers, binding agent and conductive fillers, melt mixing the hybrid conductive particle with the thermoplastic matrix and creating solid pellets. The thermally conductive polymer-based pellets include a thermoplastic matrix, a polymer fiber, a binding agent, and a thermally conductive filler.

In a third aspect, a method for manufacturing a thermally conductive component includes molding the thermally conductive component using a thermally conductive resin. The thermally conductive resin is made of a composition. The composition includes from 40 to 80 volume percentage of a thermoplastic polymer, a thermoplastic elastomer, or a combination thereof, from 5 to 30 volume percentage of a polymer fiber with an aspect ratio greater than 10, and a thermal conductivity in the axial direction greater than or equal to 1 W/m-K, from 1 to 20 volume percentage of a binding agent which increases the adhesion between the polymer fibers and conductive fillers or improves the wettability to the polymer matrix; from 10 to 40 volume percentage of a thermally conductive filler with an intrinsic thermal conductivity greater than or equal to 10 W/m-K.

While the present claim scope has been described with reference to specific examples, which are intended to be illustrative only and not to be limiting of the claim scope, it will be apparent to those of ordinary skill in the art that changes, additions and/or deletions may be made to the disclosed embodiments without departing from the spirit and scope of the claims.

The foregoing description is given for clearness of understanding only, and no unnecessary limitations should be understood therefrom, as modifications within the scope of the claims may be apparent to those having ordinary skill in the art.

The invention claimed is:

1. A thermally conductive composition comprising:
from 40 to 80 volume percentage of a thermoplastic; and
a hybrid thermally conductive filler material comprising:
from 5 to 30 volume percentage of a polymer fiber with an aspect ratio greater than 10, and a thermal conductivity in the axial direction greater than or equal to 1 W/m-K;
from 10 to 40 volume percentage of a filler with a thermal conductivity greater than or equal to 10 W/m-K in at least one direction; and
from 0.1 to 20 volume percentage of a binding agent;
wherein the hybrid thermally conductive filler material has a thermal conductivity of at least 3 W/m-K; and
wherein the thermally conductive composition is characterized by a thermal conductivity of at least 1 W/m-K.

2. The composition of claim 1, wherein the thermoplastic comprises a thermoplastic polymer selected from the group consisting of polyamide, polystyrene, polyester, acrylonitrile butadiene styrene, polyphenylene sulfide, polyphenylsulfone, polycarbonate, polyolefin, thermoplastic polyurethane, polyetherimide, liquid crystal polymer, poly(methyl methacrylate), polyaryletherketone, ethylene-vinyl acetate, acrylic styrene acrylonitrile and any combination thereof.

3. The composition of claim 1, wherein the polymer fiber comprises polyethylene terephthalate, polybutylene terephthalate, poly(p-phenylene-2,6-benzobisoxazole), polyester, polyamide, polythiophene, poly(vinyl alcohol), polyaniline, polyacrylonitrile, aramid, natural, cellulose, or any combination thereof.

4. The composition of claim 1, wherein the binding agent comprises aniline, polyaniline, poly(vinyl alcohol), thermoplastic polyurethane, epoxy, ethylene-vinyl acetate, polyethylene oxide, maelic anhydride grafted olefins, or any combination thereof.

5. The composition of claim 1, wherein the binding agent comprises a block or graft copolymer containing monomers from the thermoplastic and polymer fibers.

6. The composition of claim 1, wherein the filler has a maximum dimension less than or equal to 0.5 mm.

7. The composition of claim 1, wherein the polymer fiber has a diameter less than 0.1 mm.

8. The composition of claim 1, wherein the polymer fiber has a melting temperature greater than or equal to 20° C. above a melt processing temperature of the thermoplastic.

9. The composition of claim 1, wherein the filler comprises a thermally conductive filler selected from the group consisting of aluminum nitride, aluminum oxide, boron nitride, silicon carbide, graphite, graphene, graphite oxide, expanded graphite, carbon fibers, carbon nanotubes, metal wires, diamond particles, zinc oxide, magnesium hydroxide, silicon nitride, and any combination thereof.

10. A thermally conductive composition comprising:
a thermoplastic; and
a hybrid thermally conductive filler material comprising:
a polymer fiber;
a filler; and
a binding agent;
wherein the thermoplastic is selected from the group consisting of a thermoplastic polymer, a thermoplastic elastomer, and a combination thereof;
wherein the hybrid thermally conductive filler material has a thermal conductivity of at least 3 W/m-K; and
wherein the thermally conductive composition has a thermal conductivity of at least 1 W/m-K.

11. The composition of claim 10, wherein:
the thermoplastic is the thermoplastic polymer comprises one or more of polyamide, polystyrene, polyester, acrylonitrile butadiene styrene, polyphenylene sulfide, polyphenylsulfone, polycarbonate, polyolefin, thermoplastic polyurethane, polyetherimide, liquid crystal polymer, poly(methyl methacrylate), polyaryletherketone, ethylene-vinyl acetate, and acrylic styrene acrylonitrile;
the polymer fiber:
comprises one or more of polyethylene terephthalate, polybutylene terephthalate, poly(p-phenylene-2,6-benzobisoxazole), polyester, polyamide, polythiophene, poly(vinyl alcohol), polyaniline, polyacrylonitrile, aramid, natural, and cellulose;
has an aspect ratio greater than 10; and
a thermal conductivity in the axial direction greater than or equal to 1 W/m-K;
the filler:
comprises one or more of aluminum nitride, aluminum oxide, boron nitride, silicon carbide, graphite, graphene, graphite oxide, expanded graphite, carbon fibers, carbon nanotubes, metal wires, diamond particles, zinc oxide, magnesium hydroxide, and silicon nitride; and has a thermal conductivity greater than or equal to 10 W/m-K in at least one direction; and the binding agent comprises one or more of aniline, polyaniline, poly(vinyl alcohol), thermoplastic polyurethane, epoxy, ethylene-vinyl acetate, polyethylene oxide, and maelic anhydride grafted olefins.

12. The composition of claim 11, wherein the filler has a maximum dimension less than or equal to 0.5 mm; and wherein the polymer fiber has a diameter less than 0.1 mm.

13. The composition of claim 10, wherein the thermally conductive composition:

has a thermal conductivity of at least 5 W/m-K; and
has one or more of:
  an Izod notched impact strength of approximately 200 J/m;
  a bulk density of approximately 0.8 g/cm$^3$; and
  an electrical resistivity greater than approximately $10^{12}$ Ω-cm.

14. The composition of claim 13, wherein:

the thermoplastic comprises polycarbonate/acrylonitrile butadiene styrene;
the polymer fiber comprises polyparaphenylene terephthalamide fibers; and
the filler comprises graphite flakes.

15. The composition of claim 14, wherein:

the volume percentage of the polycarbonate/acrylonitrile butadiene styrene is approximately 63;
the volume percentage of the polyparaphenylene terephthalamide fibers is approximately 12; and
the volume percentage of the graphite flakes is approximately 25.

16. The composition of claim 13, wherein:

the polymer fiber comprises poly(phenylene benzobisthiazole) fibers;
the filler comprises graphite flakes; and
the thermoplastic binding agent comprises thermoplastic polyurethane.

17. The composition of claim 16, wherein:

the volume percentage of the poly(phenylene benzobisthiazole) fibers is approximately 20;
the volume percentage of the graphite flakes is approximately 40; and
the volume percentage of the thermoplastic polyurethane is approximately 40.

18. The composition of claim 13, wherein:

the thermoplastic comprises polycarbonate;
the polymer fiber comprises poly(p-phenylene-2,6-benzobisoxazole) fibers;
the filler comprises boron nitride flakes; and
the thermoplastic binding agent comprises thermoplastic polyurethane.

19. The composition of claim 18, wherein:

the volume percentage of the polycarbonate is approximately 66;
the volume percentage of the poly(p-phenylene-2,6-benzobisoxazole) fibers is approximately 12;
the volume percentage of the boron nitride flakes is approximately 15; and
the volume percentage of the thermoplastic polyurethane is approximately 7.

* * * * *